United States Patent
Gowda

(10) Patent No.: US 12,227,056 B2
(45) Date of Patent: Feb. 18, 2025

(54) SYSTEMS AND METHODS FOR ADJUSTING VEHICLE WINDOWS

(71) Applicant: Nissan North America, Inc., Franklin, TN (US)

(72) Inventor: Nikhil Gowda, San Francisco, CA (US)

(73) Assignee: Nissan North America, Inc., Franklin, TN (US)

( * ) Notice: Subject to any disclaimer, the term of this patent is extended or adjusted under 35 U.S.C. 154(b) by 629 days.

(21) Appl. No.: 17/459,983

(22) Filed: Aug. 27, 2021

(65) Prior Publication Data
US 2023/0062859 A1    Mar. 2, 2023

(51) Int. Cl.
*B60H 1/00*    (2006.01)
*E05F 15/695*    (2015.01)
*E05F 15/70*    (2015.01)

(52) U.S. Cl.
CPC ..... *B60H 1/00757* (2013.01); *B60H 1/00764* (2013.01); *E05F 15/695* (2015.01); *E05F 15/70* (2015.01)

(58) Field of Classification Search
CPC ............. B60H 1/00757; B60H 1/00764; E05F 15/695; E05F 15/70; E05F 15/71; E05Y 2400/42; E05Y 2800/422; E05Y 2900/55
See application file for complete search history.

(56) References Cited

U.S. PATENT DOCUMENTS

| 10,487,562 B2 * | 11/2019 | Wheeler | B60J 1/00 |
| 2016/0090773 A1 * | 3/2016 | Wippler | E05F 15/71 49/31 |
| 2018/0057012 A1 * | 3/2018 | Delgado | E05F 15/697 |
| 2019/0136604 A1 * | 5/2019 | Stebbins | E05F 15/695 |
| 2020/0002994 A1 * | 1/2020 | Peng | E05F 15/695 |
| 2020/0070627 A1 * | 3/2020 | Sakai | B60H 1/00742 |
| 2020/0256112 A1 * | 8/2020 | Williams | E05F 15/71 |
| 2021/0094380 A1 * | 4/2021 | Faust | B60H 1/00064 |

(Continued)

FOREIGN PATENT DOCUMENTS

| CN | 108556592 A | * 9/2018 | |
| CN | 111810007 A | * 10/2020 | E05F 15/70 |

(Continued)

OTHER PUBLICATIONS

Machine Translation of CN108556592A (Year: 2018).*

(Continued)

*Primary Examiner* — Sahar Motazedi
(74) *Attorney, Agent, or Firm* — Global IP Counselors, LLP

(57) ABSTRACT

Systems and methods for adjusting one or more window of a vehicle cabin are disclosed herein. In an embodiment, a system for adjusting one or more window of a vehicle cabin includes at least one noise sensor, a plurality of windows, and a controller. The at least one noise sensor is configured to detect wind noise at one or more location of the vehicle cabin. The plurality of windows are each adjustable between a plurality of configurations to permit differing levels of air flow between the vehicle cabin and an atmosphere outside of the vehicle cabin. The controller is programmed to cause an adjustment of at least one window of the plurality of windows based on feedback from the at least one noise sensor regarding a detected level of wind noise.

20 Claims, 4 Drawing Sheets

(56) References Cited

U.S. PATENT DOCUMENTS

| | | | | |
|---|---|---|---|---|
| 2022/0032746 A1* | 2/2022 | Dean | ................ | B60J 1/2097 |
| 2022/0301374 A1* | 9/2022 | Hadano | .................... | G07C 9/22 |
| 2023/0272662 A1* | 8/2023 | Katayama | .......... | B60H 1/00771 454/75 |

FOREIGN PATENT DOCUMENTS

| | | | | |
|---|---|---|---|---|
| DE | 10154873 A1 * | 5/2003 | ............... | G01H 3/00 |
| EP | 2138339 A1 * | 12/2009 | ............ | B60J 7/0573 |
| KR | 20100027520 A * | 3/2010 | | |
| KR | 20200133874 A * | 12/2020 | | |
| WO | WO-2018149682 A1 * | 8/2018 | ............ | E05F 15/695 |

OTHER PUBLICATIONS

Machine Translation of CN111810007A (Year: 2020).*
Machine Translation of KR20100027520A (Year: 2010).*
Machine Translation of KR20200133874A (Year: 2020).*
Machine Translation of DE10154873A1 (Year: 2003).*
Machine Translation of EP2138339A1 (Year: 2009).*

* cited by examiner

SYSTEMS AND METHODS FOR ADJUSTING VEHICLE WINDOWS

BACKGROUND

Technical Field

The present disclosure generally relates to a system and method for adjusting vehicle windows. More specifically, the present disclosure relates to a system and method for automatically adjusting vehicle windows based on feedback from one or more sensor.

Background Information

Most vehicles have windows that are manually opened and closed by a driver or passenger. When one or more window is open and wind noise or temperature becomes uncomfortable, the driver or passenger manually adjusts the windows to reduce the wind noise or adjust the temperature. However, this process can distract the driver from the road, and often an adjustment to reduce wind noise causes an unwanted temperature adjustment, or vice versa.

SUMMARY

It has been discovered that desired levels of wind noise and temperature can be optimized at certain window settings, which can also vary with the speed of the vehicle. The present disclosure provides systems and methods which automatically optimize window configurations to obtain desired levels of wind noise and/or temperature. The systems and methods further maintain the desired levels of wind noise and/or temperature by continuously adjusting the levels of one or more window based on feedback from various sensors and/or a driver or passenger of the vehicle. The driver or passenger is therefore not required to adjust the windows and simply provides input regarding the desired levels of wind noise and/or temperature. This improves safety since the driver does not have to visually check and adjust the windows while factoring in the noise level in the car. This also benefits the occupants because the system can automatically adjust the in-cabin temperature while ensuring the wind noise is minimum. The presently disclosed systems and methods also have further benefits beyond safety, since the systems and methods are configured to find a "sweet spot" (e.g., optimized zone) and maximize the sound quality of an in-vehicle infotainment system and warning messages.

In view of the state of the known technology, one aspect of the present disclosure is to provide a system for adjusting one or more window of a vehicle cabin. The system includes at least one noise sensor, a plurality of windows, and a controller. The at least one noise sensor is configured to detect wind noise at one or more location of the vehicle cabin. The plurality of windows are each adjustable between a plurality of configurations to permit differing levels of air flow between the vehicle cabin and an atmosphere outside of the vehicle cabin. The controller is programmed to cause an adjustment of at least one window of the plurality of windows based on feedback from the at least one noise sensor regarding a detected level of wind noise.

A second aspect of the present disclosure is to provide another system for adjusting one or more window of a vehicle cabin. The system includes a plurality of windows and a controller. The plurality of windows are each adjustable between a plurality of configurations to permit differing levels of air flow between the vehicle cabin and an atmosphere outside of the vehicle cabin. The controller is programmed to cause continuous adjustment of the plurality of windows to simultaneously maintain (i) a desired temperature of the vehicle cabin within a first range of temperature values, and (ii) a desired noise level of the vehicle cabin within a second range of noise level values.

A third aspect of the present disclosure is to provide a method of adjusting one or more window of a vehicle cabin. The method includes detecting vehicle data relating to at least one of a temperature of the vehicle cabin, a noise level of the vehicle cabin, or a speed of the vehicle cabin, determining, by a controller, an amount to adjust at least window of the vehicle cabin based on the vehicle data, and automatically causing, by the controller, the at least one window to be adjusted by the amount.

Other objects, features, aspects and advantages of the systems and methods disclosed herein will become apparent to those skilled in the art from the following detailed description, which, taken in conjunction with the annexed drawings, discloses exemplary embodiments of the disclosed systems and methods.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
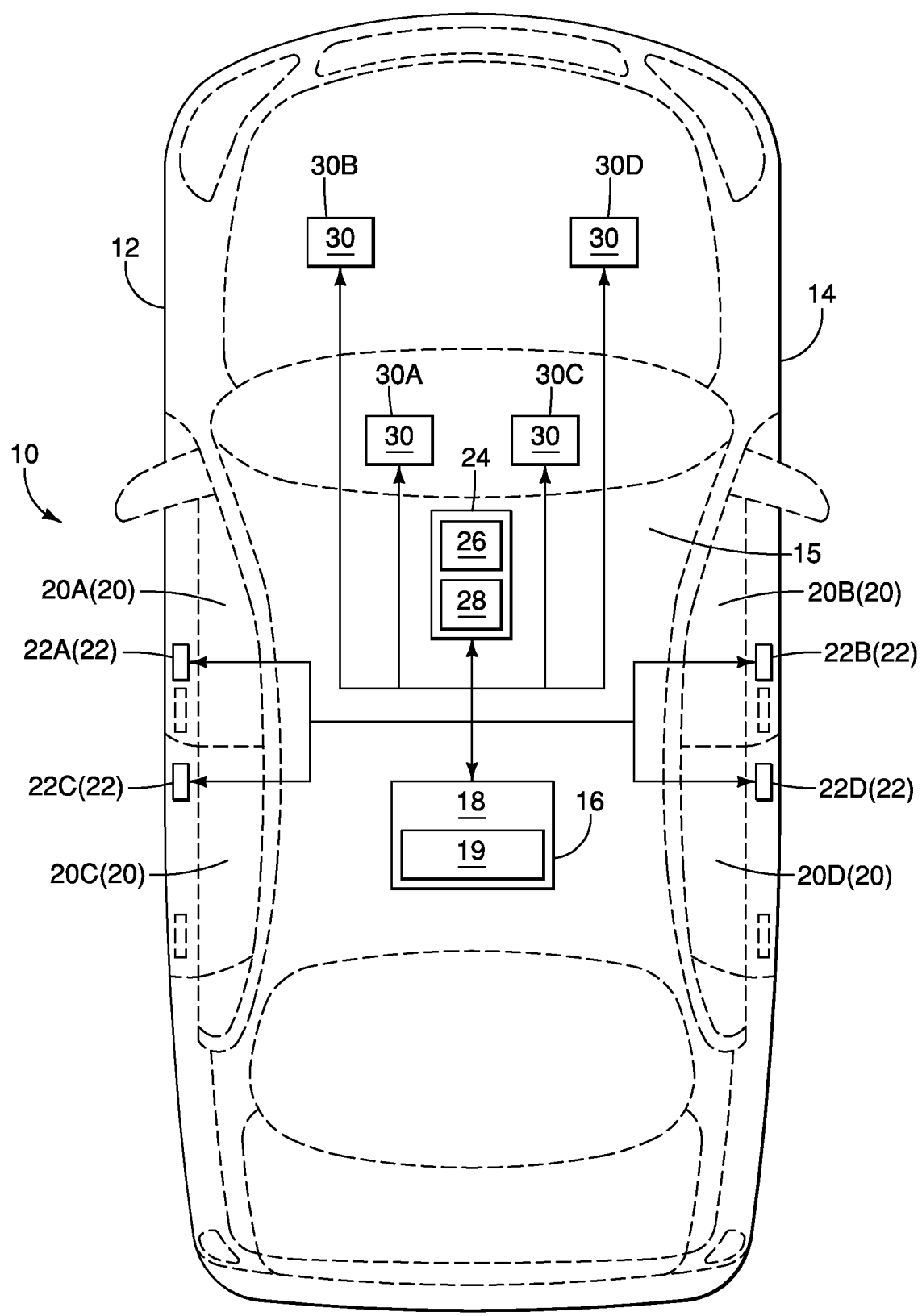
FIG. 1 illustrates a schematic diagram of an example embodiment of a system for adjusting one or more window of a vehicle cabin in accordance with the present disclosure.

Referring initially to FIG. 1, a system 10 for adjusting one or more window of a vehicle cabin 15 is illustrated in accordance with a first embodiment. In the illustrated embodiment, the system 10 includes a vehicle 12 having a vehicle body 14 and a controller 16. Alternatively, the system 10 can include the controller 16 and/or other components discussed herein and be separate from and in communication with one or more components of the vehicle 12.

In the illustrated embodiment, the vehicle body 14 includes a vehicle cabin 15. The vehicle cabin 15 is configured to seat one or more occupant (e.g., a driver and/or passenger(s)) during operation of the vehicle 12. Those of ordinary skill in the art will recognize from this disclosure that FIG. 1 illustrates one example embodiment of a vehicle cabin 15, but that the size and shape of the vehicle cabin 15 will vary based on vehicle type, size, and other factors.

In an embodiment, the controller 16 includes at least one processor 18 and at least one memory 19. The controller 16 preferably includes a microcomputer with a window control program that controls a plurality of windows 20 as discussed below. The controller 16 can also include other conventional components such as an input interface circuit, an output interface circuit, and storage devices such as a ROM (Read Only Memory) device and a RAM (Random Access Memory) device. The microcomputer of the controller 16 is programmed to control one or more window 20, audio device 24 and/or sensor 30 discussed herein. The memory circuit stores processing results and control programs such as ones for window control operations that are run by the processor circuit. The controller 16 is operatively coupled to the vehicle body 14 in a conventional manner. The internal RAM of the controller 16 stores statuses of operational flags and various control data. The internal ROM of the controller 16 stores the instructions for various operations. The controller 16 is capable of selectively controlling any of the windows 20 of the vehicle 12 in accordance with the control program.

The vehicle 12 includes at least one window 20. More specifically, the vehicle 12 includes a plurality of windows 20. In the illustrated embodiment, the plurality of windows 20 include a front driver-side window 20A, a front passenger-side window 20B, a rear driver-side window 20C, and a rear passenger-side window 20D. Those of ordinary skill in the art will recognize from this disclosure that different types of vehicles can include more or less windows 20.

Each window 20 of the plurality of windows 20 is adjustable between a plurality of configurations to permit differing levels of air flow between the vehicle cabin 15 and an atmosphere outside of the vehicle cabin 15. In an embodiment, each window 20 is adjustable between at least an open configuration and a closed configuration. More specifically, each window 20 is adjustable between a plurality of open configurations and a closed configuration. The plurality of open configurations include various open configurations which permit different levels of air flow between the vehicle cabin 15 and an atmosphere outside of the vehicle cabin 15. For example, the plurality of open configurations can include a first open configuration in which the window is open by a first distance (e.g., 1 cm), a second open configuration in which the window is open by a second distance (e.g., 2 cm), a third open configuration in which the window is open by a third distance (e.g., 3 cm), etc. The closed configuration does not allow air flow between the vehicle cabin 15 and an atmosphere outside of the vehicle cabin 15 through that window 20.

In an embodiment, one or more of the windows 20 are transparent. In an embodiment, the plurality of windows 20 can include other types of windows 20 besides those shown, for example, a sunroof or another type of vent which creates a window to the outside atmosphere to allow air flow when the vent is opened.

In an embodiment, the vehicle 12 includes at least one window configuration sensor 22. More specifically, the vehicle 12 includes a plurality of window configuration sensors 22. In the illustrated embodiment, the plurality of window configuration sensors 22 include a front driver-side window configuration sensor 22A, a front passenger-side window configuration sensor 22B, a rear driver-side window configuration sensor 22C, and a rear passenger-side window configuration sensor 22D. Each window configuration sensor 22 senses the configuration of a respective window 20 and generates corresponding window configuration data. For example, each window configuration sensor 22 is configured to sense the distance that its respective window 20 is opened. Thus, in the illustrated embodiment, the front driver-side window configuration sensor 22A senses the configuration of the front driver-side window 20A, the front passenger-side window configuration sensor 22B senses the configuration of the front passenger-side window 20B, the rear driver-side window configuration sensor 22C senses the configuration of the rear driver-side window 20C, and the rear passenger-side window configuration sensor 22D senses the configuration of the rear passenger-side window 20D. In an embodiment, each window configuration sensor 22 is configured to determine whether a respective window 20 is in the closed configuration, the first open configuration, the second open configuration, the third open configuration, etc.

The vehicle 12 includes an audio device 24. The audio device 24 is configured to receive an audible command from an occupant of the vehicle 12. The occupant can be a driver or passenger. The audio device 24 can also serve other functions within the vehicle 12, for example, can also be used by a navigation system, an in-vehicle entertainment unit, or another vehicle component. In an embodiment, the vehicle 12 includes multiple audio devices 24.

The audio device 24 includes a microphone 26. The microphone 26 is configured to receive the audible command from the occupant of the vehicle 12. In an embodiment, the audio device 24 also includes a speaker 28 configured to provide an audible output to the occupant. In an embodiment, the microphone 26 and the speaker 28 are located together on the same unit. Alternatively, the microphone 26 and the speaker 28 can be located separately. In an embodiment, the audio device 24 can include multiple microphones 26 and/or multiple speakers 28 located at different locations within the vehicle 12.

In an embodiment, a vehicle occupant can set and/or adjust a desired noise level and/or a desired temperature level by speaking an audible command into the audio device 24. For example, an occupant can say "Set the temperature at 70 degrees" to set the desired temperature level at seventy degrees or within a range of seventy degrees. The occupant can also speak more generically with phrases such as "Turn the temperature down" to lower the desired temperature level, or "Lower the noise level" to lower the desired noise level. The audio device 24 is configured to generate command data based on these types of audible command. In an embodiment, the command data represents the audible command received by the audio device 24. In an embodiment, each distinct audible command received by the audio device 24 results in the generation of distinct command data. In an embodiment, the command data includes an automatic speech recognition (ASR) output and/or a natural language understanding (NLU) output and/or is used to generate an ASR output and/or an NLU output. The audio device and/or controller 16 is configured with speech recognition software to interpret the command data and set or adjust a desired noise level and/or temperature level based thereon.

In an embodiment, the vehicle 12 includes a user interface (not shown) which enables a vehicle occupant can set and/or adjust a desired noise level and/or a desired temperature level. The user interface can be instead of or in addition to the audio device 24. The occupant can set the desired noise level and/or the desired temperature level, for example, by choosing a level or range on the user interface. The occupant can set the desired noise level and/or the desired temperature level, for example, by choosing to raise or lower a current noise level and/or a current temperature level by an undetermined amount.

In the illustrated embodiment, the vehicle 12 includes at least one sensor 30. More specifically, the vehicle 12 includes a plurality of sensors 30. Each sensor 30 is configured to generate vehicle data. The vehicle data relates to a current state of the vehicle 12. In an embodiment, the vehicle data includes at least one of (i) a temperature within the vehicle cabin 15, (ii) a temperature of the atmosphere outside of the vehicle cabin 15, (iii) a noise level within the vehicle cabin 15, and/or (iv) a speed of the vehicle 12. Those of ordinary skill in the art will recognize from this disclosure that there are also other types of vehicle data capable of detection by a sensor 30. A sensor 30 can be located inside or outside of the vehicle 12. As should be understood by those of ordinary skill in the art from this disclosure, the location and type of sensor 30 will typically depend on the type of vehicle data being gathered.

In an embodiment, the at least one sensor 30 includes at least one temperature sensor 30A, 30B configured to measure temperature inside and/or outside of the vehicle cabin 15. As described in more detail below, the controller 16 is programmed to adjust at least one window 20 based on feedback from the at least one temperature sensor 30A, 30B. In an embodiment, the at least one temperature sensor 30A, 30B includes at least one inside temperature sensor 30A configured to measure temperature inside the vehicle cabin 15. In an embodiment, the at least one temperature sensor 30A, 30B includes at least one outside temperature sensor 30B configured to measure temperature outside the vehicle cabin 15 (e.g., the atmosphere outside the vehicle cabin 15). In an embodiment, the at least one temperature sensor 30A, 30B is also used for other vehicle functions, for example, informing an occupant of the inside or outside temperature via the user interface so that the occupant can adjust temperature settings accordingly. As described in more detail below, the controller 16 is programmed to cause an adjustment of at least one window 20 of the plurality of windows 20 based on feedback from the at least one temperature sensor 30A, 30B based on a detected temperature inside and/or outside of the vehicle cabin 15.

In an embodiment, the controller 16 is programmed to use a temperature differential determined based on feedback from the inside temperature sensor 30A and the outside temperature sensor 30B to determine an amount to adjust at least one of the plurality of windows 20. In an embodiment, the temperature differential is the difference between the inside temperature and the outside temperature. In an embodiment, the temperature differential can be a positive number or a negative number depending on whether the outer atmosphere is warmer or colder than the temperature inside the vehicle cabin 15.

In an embodiment, the at least one sensor 30 includes at least one noise sensor 30C configured to detect wind noise at one or more location of the vehicle cabin 15. In an embodiment, the at least one noise sensor 30C includes a microphone located within the vehicle cabin 15. The microphone 26 discussed herein can operate as at least one noise sensor 30C. As explained in more detail below, the controller 16 is programmed to cause an adjustment of at least one window 20 of the plurality of windows 20 based on feedback from the at least one noise sensor 30 regarding a detected level of wind noise.

In an embodiment, the at least one sensor 30 includes at least one speed sensor 30D configured to detect a speed of the vehicle 12. The at least one speed sensor 30D can include a wheel speed sensor. As described in more detail below, the controller 16 is programmed to cause an adjustment of at least one window 20 of the plurality of windows 20 based on feedback from the at least one speed sensor 30D based on a detected speed of the vehicle 12. In an embodiment, a speed sensor 30D is configured to determine the speed of the vehicle 12 by measuring transmission/transaxle output or wheel speed. In an embodiment, a speed sensor 30D can be an existing speed sensor which is used for other functions on the vehicle 12, for example, displaying a current speed of the vehicle 12 to the driver on the dashboard or operating a cruise control function.

Figure 2:
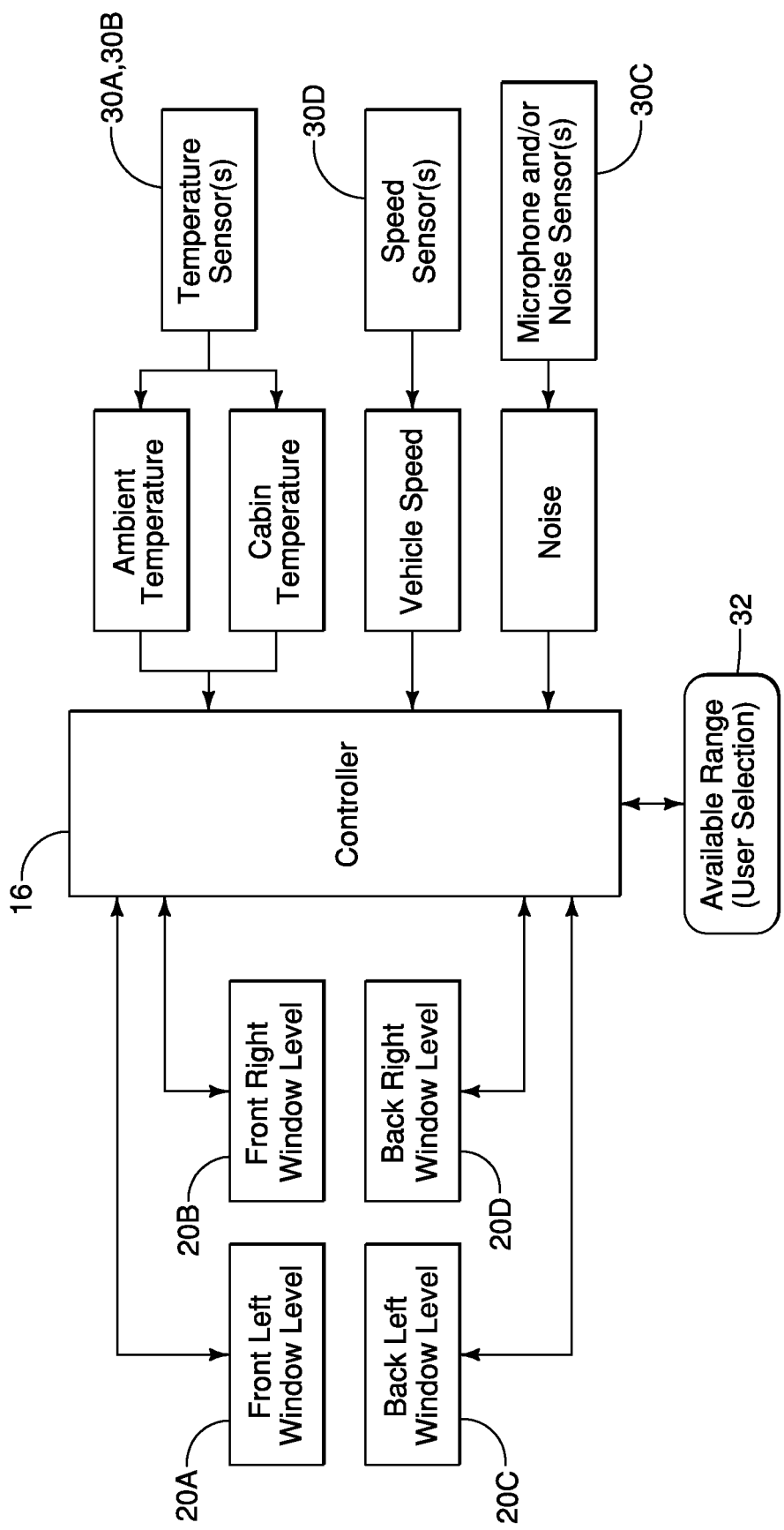
FIG. 2 illustrates another schematic diagram of an example embodiment of the system of FIG. 1.

FIG. 2 illustrates a schematic diagram showing how the controller 16 is programmed to use vehicle data received from at least one sensor 30 to adjust the configuration of one or more window 20. As illustrated, each sensor 30 feeds vehicle data into the controller 16. More specifically, at least one of: (i) an inside temperature sensor 30A continuously provides cabin temperature to the controller 16; (ii) an outside temperature sensor 30B continuously provides ambient temperature to the controller 16; (iii) a noise sensor 30C continuously provides a wind noise level to the controller 16; and/or (iv) a speed sensor 30D continuously provides a current speed of the vehicle 12 to the controller 16. In an embodiment, the inside temperature sensor 30A and the outside temperature sensor 30B continuously provide a temperature differential to the controller 16 and/or the controller 16 determines a temperature differential based on feedback from the inside temperature sensor 30A and the outside temperature sensor 30B.

The controller 16 is also configured to receive a user selection 32 from an occupant of the vehicle 12. In an embodiment, the user selection 32 includes a desired noise level and/or a desired temperature level. In an embodiment, the controller 16 receives the user selection 32 via the audio device 24. That is, an occupant of the vehicle 12 speaks the user selection 32 into the microphone 26 of the audio device 24 (e.g., "Set the temperature at 70 degrees", "Turn the temperature down", or "Lower the noise level"), and the speech is interpreted using speech recognition software. In another embodiment, the controller 16 receives the user selection 32 via a user interface (e.g., via a selection on a graphical user interface on the dashboard, via a knob or switch on the dashboard, etc.).

In an embodiment, the user selection 32 specifies a desired noise level within the vehicle cabin 15. In an embodiment, the desired noise level is a maximum allowable noise level. The desired noise level can include a target value and/or a range of target values. In an embodiment, the user selection 32 specifies a specific desired noise level (e.g., that the desired noise level should be below a specific decibel level). In an embodiment, the user selection 32 specifies a range of acceptable noise levels (e.g., that the desired noise level should be within a range of decibels, such as between 0 decibels and a maximum level). In an embodiment, the user selection 32 specifies that the noise level should be one of a plurality of predetermined levels (e.g., low level, medium level, or high level). In an embodiment, the user selection 32 specifies that the currently set desired noise level should be raised or lowered, and the controller 16 automatically adjusts the desired noise level (e.g., automatically decreases the maximum allowable noise level).

In an embodiment, the user selection 32 specifies a desired temperature level within the vehicle cabin 15. The desired temperature level can include a target value and/or a range of target values. In an embodiment, the user selection 32 specifies a specific desired temperature level (e.g., that the desired temperature level should be a specific temperature). In an embodiment, the user selection 32 specifies a range of acceptable temperature levels (e.g., that the desired temperature level should be within a range of temperatures). In an embodiment, the user selection 32 specifies that the temperature level should be one of a plurality of predetermined levels (e.g., low level, medium level, or high level). In an embodiment, the user selection 32 specifies that the currently set desired temperature level should be raised or lowered, and the controller 16 automatically adjusts the desired temperature level (e.g., automatically increases or decreases the currently set desired temperature level by a number of degrees).

As illustrated in FIG. 2, the controller 16 is configured to independently adjust each window 20. Specifically, the controller 16 is configured to independently adjust each of the front driver-side window 20A, the front passenger-side window 20B, the rear driver-side window 20C, and the rear passenger-side window 20D. As explained in more detail below, the controller 16 is configured to continuously and independently adjust each window 20 to achieve the desired user selection 32 based on feedback from one or more sensor 30.

Figure 3:
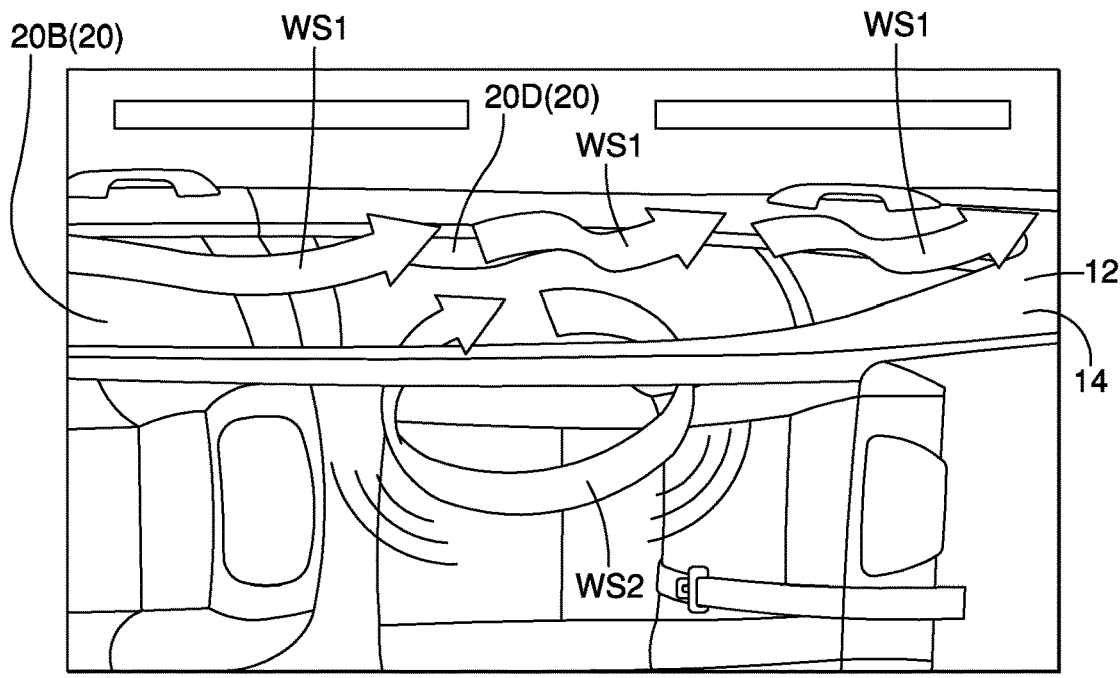
FIG. 3 illustrates a partial top view of an example embodiment of the system of FIGS. 1 and 2.

FIG. 3 illustrates an example illustration of how opening a window 20 can create wind noise within the vehicle cabin 15. In FIG. 3, the vehicle 12 is shown with only the rear passenger-side window 20D open. A first wind stream WS1 is passing along the side of the vehicle 12. The open rear passenger-side window 20D allows a second wind stream WS2 to form within the vehicle 12. The second wind stream WS2 creates wind noise within the vehicle cabin 15, for example, due to the wind itself and the vibration of various vehicle components due to the wind. One way to reduce the wind noise is to open at least one other window 20 so that the second wind stream WS2 escapes through the other window 20. The system 10 is configured to adjust the other windows 20 to optimize the overall noise level.

Figure 4:
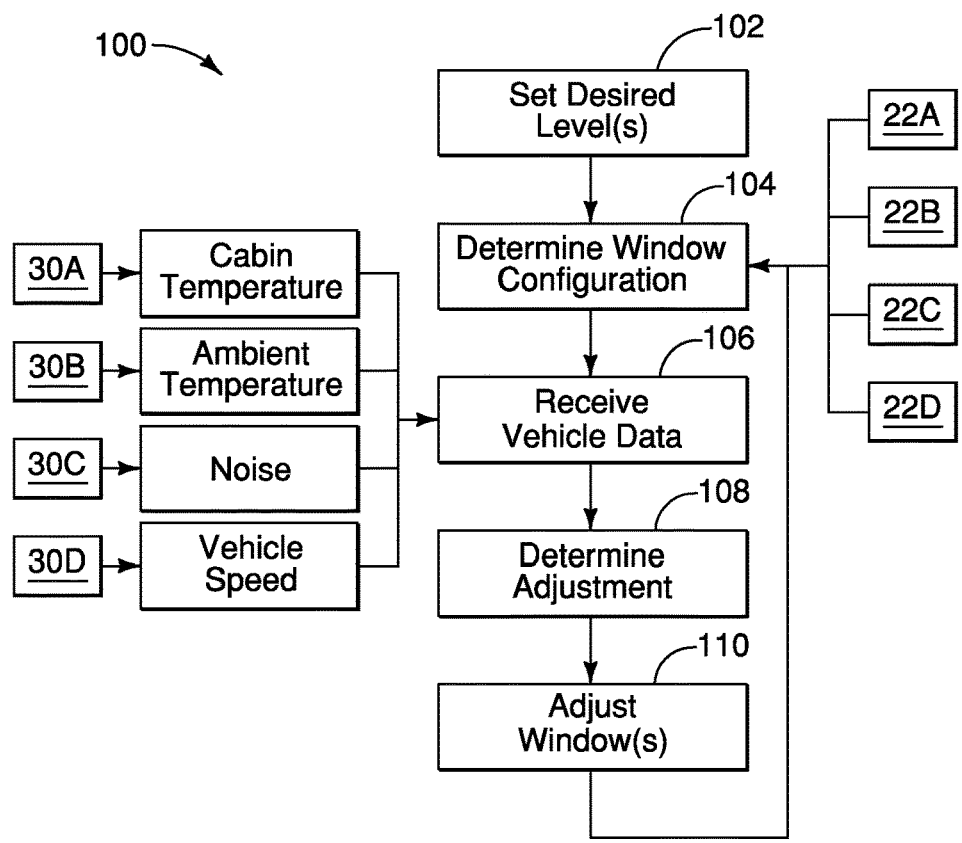
FIG. 4 illustrates an example embodiment of a method of adjusting one or more window of a vehicle cabin which can be implemented using the system of FIGS. 1 to 3.

FIG. 4 illustrates an example embodiment of a method 100 of adjusting one or more window 20 of a vehicle cabin 15. Some or all of the steps of the method 100 can be stored as instructions on at least one memory 19 of the controller 16 and executed by at least one processor 18 of the controller 16. Some or all of the steps of the method 100 can also be stored as instructions on a memory of one or more of a window 20, window configuration sensor 22, audio device 24 and/or sensor 30 and executed by a processor of the window 20, window configuration sensor 22, audio device 24 and/or sensor 30. It should be understood from this disclosure that some of the steps described herein can be reordered or omitted without departing from the spirit or scope of method 100.

At step 102, the system 10 sets at least one desired level. The desired level can include a desired noise level. The desired level can include a desired temperature level. In an embodiment, the desired level includes both a desired noise level and a desired temperature level. In an embodiment, at least one desired level is preset by the controller 16. In an embodiment, at least one desired level (e.g., one of the desired noise level and the desired temperature level) is preset by the controller 16, while another desired level (e.g., the other of the desired noise level and the desired temperature level) is set by the controller 16 based on a user selection 32. In an embodiment, at least one desired level can be preset, for example, based on a previous configuration (e.g., based on previous user selections 32 during previous uses of the vehicle 12). In an embodiment, the controller 16 provides the occupant with a temperature range to select from (e.g., via an in-vehicle user interface, the audio device 24, etc.) within which noise and buffeting is determined to be minimum, and the occupant selects the desired temperature level based on the range provided. In an embodiment, the controller 16 provides the occupant with the temperature range to select from after performing a calibration process, for example, as discussed below.

In an embodiment, at least one desired level is set by the controller based on a user selection 32. In an embodiment, the controller 16 receives the user selection 32 via the audio device 24 as discussed herein. In another embodiment, the controller 16 receives the user selection 32 via a user interface as discussed herein.

In an embodiment, the configuration of at least one window 20 can be preset. For example, the driver may prefer for the front driver-side window 20A to be closed or in a predetermined open configuration (e.g., opened by a preferred amount). In an embodiment, an occupant can lock at least one window 20 into a predetermined configuration, and the controller 16 will adjust the rest of the windows 20 based on the predetermined configuration of the locked window. In an embodiment, all of the plurality of windows 20 begin in a closed configuration. In another embodiment, all of the plurality of windows begin in a predetermined open configuration. The predetermined open configuration can be determined, for example, based on previous settings preferred by the occupant of the vehicle 12 and/or based on an optimized zone determined from a calibration process.

In an embodiment, the system 10 performs a calibration process at step 102. During the calibration, the controller 16 causes the windows 20 to move to various configurations while recording corresponding vehicle data. In an embodiment, the controller 16 causes the windows 20 to move through a plurality of open configurations while recording corresponding vehicle data. This allows the controller 16 to determine, based on the current configuration of the vehicle cabin 15 and the current conditions outside the vehicle 12, how wind noise within the vehicle cabin 15 will change based on different window configurations. In an embodiment, this also allows the controller 16 to determine how temperature will change based on different window configurations. In an embodiment, this also allows the controller 16 to determine how wind noise and/or temperature will change based on different window configurations in view of the speed of the vehicle 12.

In an embodiment, the controller 16 uses the calibration to determine at least one desired level. More specifically, the controller 16 uses the calibration to determine a range of temperature levels at which the wind noise level is minimized. In an embodiment, the controller 16 is configured to enable an occupant to choose from the range of temperature levels to set the desired temperature level. This way, the controller 16 ensures that the desired temperature level is possible while the wind noise level is minimized. In an embodiment, the controller 16 is configured to set the desired noise level at a noise level determined to be within an optimal range based on the calibration.

Figure 5:
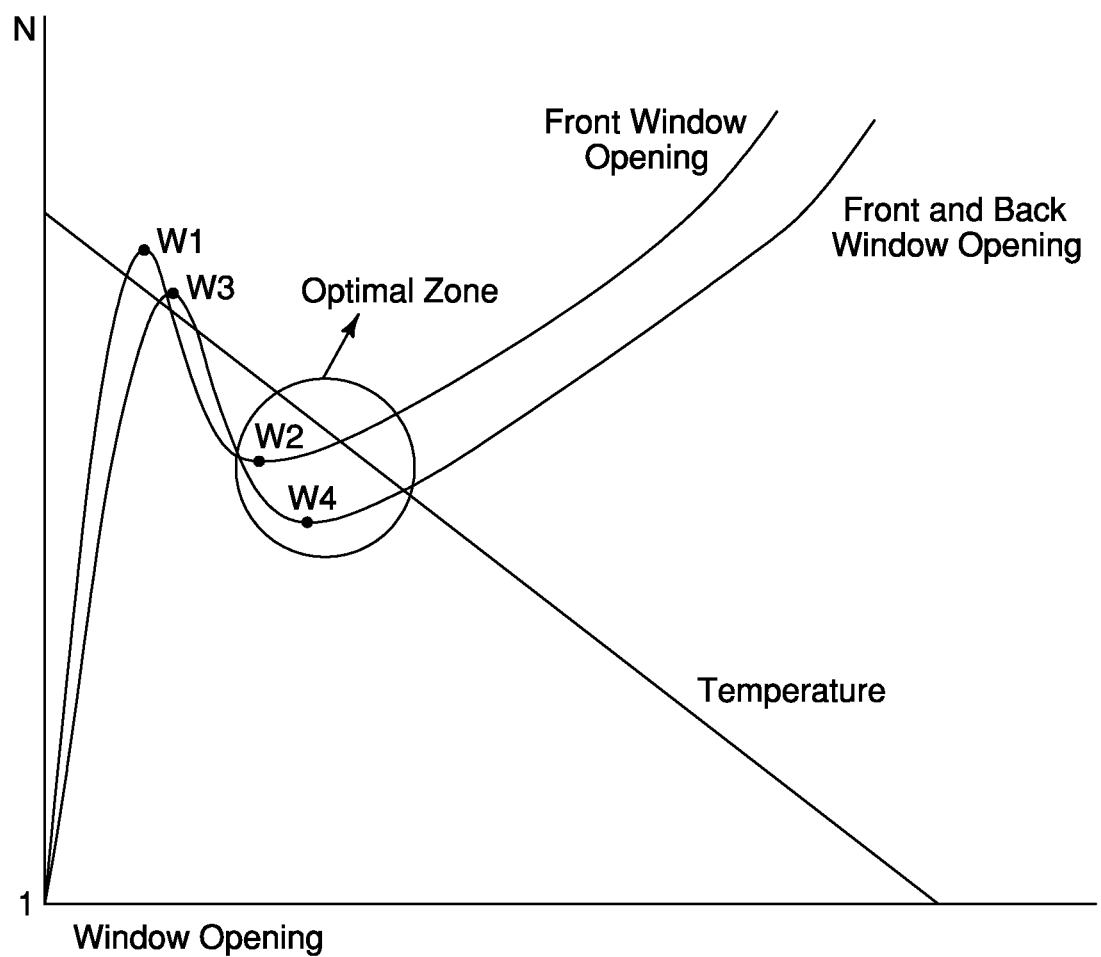
FIG. 5 illustrates an example embodiment of an optimized zone in which both a desired temperature and a desired noise level are obtained by adjusting one or more window.

FIG. 5 illustrates an example embodiment of how the controller 16 is configured to perform a calibration process. More specifically, FIG. 5 illustrates an example embodiment of how the controller 16 is configured to determine an optimal zone in which both a desired temperature of the vehicle cabin 15 is within a first range of temperature values and a desired noise level of the vehicle cabin 15 is within a second range of noise level values. As illustrated, wind noise tends to quickly increase when the windows 20 are first opened, then drop to a minimum at an intermediate opened level, then rise again as the windows 20 continue to be lowered past the intermediate level. For example, for the front window opening in FIG. 5, the wind noise quickly increases to a first maximum level W1 when the front window 20 is first opened, then drops to a minimum level W2 at an intermediate open configuration level, then continues to rise as the front window 20 is opened further. Likewise, for the front and back windows 20 opening, the wind noise quickly increases to a first maximum level W3 when the front and back windows 20 are first opened, then drops to a minimum level W4 at an intermediate opened level, then continues to rise as the front and back windows 20 are opened further. Temperature tends to vary more linearly with the level that the windows 20 are opened (e.g., drop as shown when the outside temperature is cooler than the inside temperature, or raise when the outside temperature is hotter than the inside temperature).

In an embodiment, the controller 16 is programmed to determine the optimal zone using feedback from one or more sensor 30. For example, using data from a noise sensor 30C, the controller 16 can determine the precise intermediate window levels at which wind noise is minimized (e.g., a range between W1 and W2 for the front window, a range between W3 and W4 for the front and rear windows). The optimal zone can also be determined based on the maximum desired noise level that the occupant sets (e.g., between the maximum desired noise level and W2 for the front window, between the maximum desired noise level and W4 for the front and rear windows, etc.). The controller 16 can further determine how the noise level varies with the temperature using feedback from one or more temperature sensor 30A, 30B. For example, the controller 16 can determine a range of temperatures which exist within a desired wind noise range. Using this data, the controller 16 is configured to determine the optimal zone at which to maintain the windows 20. The controller 16 is further configured to determine precise window configurations which cause the wind noise to fall within the optimal zone.

In an embodiment, the controller 16 is configured to determine the optimal zone by opening one or more window 20 and measuring the noise level and/or temperature change as the one or more window 20 moves through different configurations. That is, while the windows 20 are opening, the controller 16 is configured to determine the first maximum level (e.g. W1, W3) where the wind noise initially peaks, and the controller 16 is configured to determine the minimum level (e.g., W2, W4) where the wind noise bottoms out before rising again. The controller 16 is configured to then store the window configurations in which the wind noise falls within the optimal zone. In an embodiment, the controller 16 is configured to locate the optimal zone based on the desired noise level and/or the desired temperature level requested by the occupant. For example, the controller 16 is configured to locate the optimal zone to be below a maximum desired noise level as discussed herein.

In an embodiment, the controller 16 performs the calibration using different combinations of window settings. For example, in FIG. 5, the controller 16 performs a first calibration for a front window (e.g., for one or both of windows 20A, 20B to determine W1 and W2), and then the controller 16 performs a second calibration for a front and rear window (e.g., for a combination of windows 20A, 20B, 20C, 20D to determine W3 and W4). In this way, the controller 16 is configured to determine how different settings for different combinations of windows 20 affect the wind noise level and/or temperature level. In an embodiment, the controller 16 performs a plurality of calibrations, with each calibration being for a different window 20 and/or a different combination of windows 20. The controller 16 stores the vehicle data related to these calibrations in the memory 19 and uses these calibrations to later determine the amount to move each window 20 to achieve specific settings.

In an embodiment, the controller 16 determines the range of temperatures which fall within the optimal zone. In an embodiment, the optimal zone includes a range of temperatures that exist between the first maximum level (e.g. W1, W3) and the minimum level (e.g., W2, W4). In an embodiment, the optimal zone includes a range of temperatures that exist between a maximum desired noise level and the minimum level (e.g., W2, W4). In an embodiment, the optimal zone includes a range of temperatures that exist below a maximum desired noise level. The controller 16 then enables the vehicle occupant to choose a desired temperature level (or range) within the range of temperatures which fall within the optimal zone. In this way, the controller 16 ensures that a desired temperature level can be met while also ensuring that the wind noise level remains within an optimal range. The controller 16 then performs the method 100 to maintain the temperature and/or wind noise at the desired level.

In an embodiment, the calibration does not need to be performed each time the method 100 is used. For example, the controller 16 can perform a single calibration and save the results for future uses of the vehicle 12. In another example, the controller 16 can periodically perform the calibration and update the results for future uses. In another example, the calibration can be performed by another similar vehicle, and the results can be saved on the memory 19 for use by the controller 16 with the vehicle 12.

In an embodiment, the occupant can trigger the controller 16 to perform the calibration to find the optimized zone. For example, the occupant can say "optimize windows for less noise" or "optimize windows for least temperature" into the audio device 24, and the controller 16 can the determine the optimal settings using a calibration as discussed herein while the car is moving and wind noise levels are changing.

In an embodiment, the controller 16 also determines the speed of the vehicle 12 during calibration based on feedback from the speed sensor 30D. The controller 16 is configured to then determine how the optimal zone will change based on the speed of the vehicle 12. For example, wind noise tends to vary based on speed, so the controller 16 is configured to determine how the optimal zone will shift as the speed of the vehicle 12 changes. In an embodiment, the controller 16 places the windows 20 in the optimal zone during step 102 and then proceeds to adjust the windows 20 based on the speed of the vehicle 12 (e.g., raise windows if speed is higher than calibration, lower the windows 20 if speed is lower than calibration).

Returning again to FIG. 4, at step 104, the controller 16 determines the current window configuration. The current configuration can be the initial window configuration. The current/initial window configuration can be set based on an optimal zone determined from a calibration. The current window configuration can be, for example, a closed configuration or one of a plurality of open configurations (e.g., each window 20 open by 1 cm, 2 cm, 3 cm, etc.). In an embodiment, the controller 16 determines the current window configuration based on configuration data received from at least one window configuration sensor 22. In an embodiment, the controller 16 determines the current window configuration based on configuration data stored in the memory 19 based on how one or more window 20 was set previously, for example, during a previous implementation of the method 100.

At step 106, the controller 16 receives vehicle data. In an embodiment, the vehicle data is detected by at least one sensor 30. In an embodiment, the detected vehicle data relates to at least one of a temperature of the vehicle cabin, a noise level of the vehicle cabin, or a speed of the vehicle cabin. More specifically, the detected vehicle data includes: (i) a temperature within the vehicle cabin 15, (ii) a temperature of the atmosphere outside of the vehicle cabin 15, (iii) noise within the vehicle cabin 15, and/or (iv) a speed of the vehicle 12. In an embodiment, the detected vehicle data includes a temperature differential based on the cabin temperature inside the vehicle cabin 15 and the ambient temperature outside the vehicle cabin 15.

If, at step 106, the vehicle data indicates that the desired levels (e.g., the desired noise level and/or the desired temperature level) are being met or are within an acceptable range, the method 100 can remain at step 106 until the vehicle data indicates that a desired level is not being met or is not within an acceptable range, or until an occupant adjusts one or more desired level. In an ideal setting, the initial window configuration (e.g., based on a determined optimal zone) would maintain a desired temperature of the vehicle cabin 15 within a first range of temperature values and a desired noise level of the vehicle cabin 15 within a second range of noise level values throughout use of the vehicle 12. However, as will be understood by those of ordinary skill in the art from this disclosure, continuous adjustments to the window configuration may also need to be made based on real world variables so as to maintain the desired temperature of the vehicle cabin 15 within the first range of temperature values and the desired noise level of the vehicle cabin 15 within the second range of noise level values. Thus, for example, if the vehicle data indicates that a current temperature is outside the first range of temperature values and/or that a current noise level is outside the second range of noise level values, then the method 100 moves to step 108. Similarly, in an embodiment, a vehicle occupant may desire to adjust a desired noise level and/or temperature level after the initial settings, in which case the method 100 can use steps 108 and 110 to make the adjustment.

At step 108, the controller 16 determines an amount to adjust at least one window 20 of the vehicle cabin 15 based on the vehicle data. The amount can be a numerical value. The amount can also be an amount needed to move from one of a plurality of open configurations to another of the plurality of open configurations. Those of ordinary skill in the art will recognize from this disclosure that the exact amounts will vary for different vehicles 12, for example, based on the type of vehicle cabin 15 and corresponding conditions.

In an embodiment, the controller 16 determines the amount to adjust at least one window 20 of the vehicle cabin 15 based on feedback from the inside temperature sensor 30A. For example, the controller 16 is configured to determine that the temperature inside the vehicle cabin 15 is lower than a desired temperature level and determine an amount to adjust at least one window 20 based thereon. In another example, the controller 16 is configured to determine that the temperature inside the vehicle cabin 15 is higher than a desired temperature level and determine an amount to adjust at least one window 20 based thereon. In an embodiment, while determining the amount to adjust based on inside temperature, the controller 16 also ensures that the amount to adjust the window 20 would not take the wind noise level outside of the optimal zone (e.g., as shown in FIG. 5).

In an embodiment, the controller 16 determines the amount to adjust at least one window 20 of the vehicle cabin 15 based on feedback from the outside temperature sensor 30B. For example, the controller 16 is configured to determine that the temperature outside the vehicle cabin 15 has decreased and determine an amount to adjust at least one window 20 based thereon. In another example, the controller 16 is configured to determine that the temperature outside the vehicle cabin 15 has increased and determine an amount to adjust at least one window 20 based thereon. In an embodiment, while determining the amount to adjust based on outside temperature, the controller 16 also ensures that the amount to adjust the window 20 would not take the window noise level outside of the optimal zone (e.g., as shown in FIG. 5).

In an embodiment, the controller 16 determines the amount to adjust at least one window 20 of the vehicle cabin 15 based on feedback regarding both the temperature inside the vehicle cabin 15 and the temperature outside the vehicle cabin 15. For example, if the temperature inside the vehicle cabin 15 is below a desired temperature level and the temperature outside the vehicle cabin 15 is above the desired temperature level, the controller 16 is configured to determine an amount to open at least one window 20 so that outside air raises the temperature inside the vehicle cabin 15 to the desired temperature level. In another example, if the temperature inside the vehicle cabin 15 is above a desired temperature level and the temperature outside the vehicle cabin 15 is below the desired temperature level, the controller 16 is configured to determine an amount to open at least one window 20 so that outside air lowers the temperature inside the vehicle cabin 15 to the desired temperature level. In an embodiment, while determining the amount to adjust based on the inside and outside temperatures, the controller 16 also ensures that the amount to adjust the window 20 would not take the wind noise level outside of the optimal zone (e.g., as shown in FIG. 5).

In an embodiment, the controller 16 uses the temperature differential to determines an amount to adjust at least one window 20. More specifically, the controller 16 determines an amount to adjust at least one window 20 based on the magnitude of the temperature differential. In this way, the controller 16 is configured to achieve the desired temperature level in the vehicle cabin 15 as quickly as possible. In an embodiment, while determining the amount to adjust based on the temperature differential, the controller 16 also ensures that the amount to adjust the window 20 would not take the wind noise level outside of the optimal zone (e.g., as shown in FIG. 5).

In an embodiment, the controller 16 determines the amount to adjust at least one window 20 of the vehicle cabin 15 based on feedback from the noise sensor 30C. In an embodiment, the controller 16 determines an amount to adjust at least one window when a detected noise level within the vehicle cabin 15 is above a maximum allowable noise level. In an embodiment, using an optimal zone determined as shown in FIG. 5, the controller 16 is configured to determine whether further opening or closing one or more window 20 will raise or lower the overall wind noise level. For example, after storing data regarding the window configurations which cause different noise levels within the optimal zone, the controller 16 can determine to adjust one or more window 20 by an amount to achieve one of those window configurations if the current noise level needs to be lowered. In an embodiment, the controller 16 is programmed to maintain a desired temperature within the vehicle cabin 15 when causing the adjustment of the at least one window

20 based on feedback from the at least one noise sensor 30C. For example, the controller 16 can use a determined optimal zone as described herein to determine how noise level can be adjusted with different window adjustments without significantly affecting the temperature.

In an embodiment, the controller 16 determines the amount to adjust at least one window 20 of the vehicle cabin 15 based on feedback from at least one temperature sensor 30A, 30b and based on feedback from the noise sensor 30C. For example, the controller 16 determines whether the wind noise is below a maximum allowable noise level. If the wind noise is below a maximum allowable noise level, then there is room for the controller 16 to allow the wind noise to increase for the purpose of adjusting the temperature. The controller 16 therefore allows at least one window 20 to be adjusted by an amount needed to adjust the inside temperature by allowing more or less air into the vehicle cabin 15, while still maintaining the overall wind noise level below the maximum allowable noise level.

In an embodiment, the controller 16 uses other noise besides wind noise to determine the amount to adjust at least one window 20. For example, if the noise sensor 30C detects that occupants are speaking, then the controller 16 is configured to determine that at least one window 20 should be adjusted to reduce wind noise so that the occupant's voice is not overtaken by wind noise. Similarly, the controller 16 is configured to determine that at least one window 20 should be adjusted to reduce wind noise upon detection of a predetermined volume of a radio or another noise so as not overtaken by wind noise. Thus, in an embodiment, the controller 16 is configured to lower the maximum allowable wind noise level when the audio device detects that occupants are speaking, that the radio or another noise is present in the vehicle, etc. The controller 16 is then configured to determine the amount to adjust at least one window 20 based on the new maximum allowable wind noise level.

In an embodiment, the controller 16 determines the amount to adjust at least one window 20 of the vehicle cabin 15 based on feedback from the speed sensor 30D. As the vehicle 12 speeds up, the noise from wind passing into the vehicle cabin 15 tends to increase. In an embodiment, the controller 16 causes one or more window 20 to be adjusted as the speed of the vehicle 12 increases. Likewise, in an embodiment, the controller 16 causes one or more window 20 to be adjusted as the speed of the vehicle 12 decreases. In an embodiment, the controller 16 sets speed thresholds based on feedback from the speed sensor 30D. For example, if the plurality of windows 20 begin in a first open configuration (e.g., open about 5 cm), the controller 16 is configured to maintain the plurality of windows at the first open configuration until the speed of the vehicle 12 reaches a first predetermined speed (e.g., 30 mph); when the speed reaches the first predetermined speed, the controller 16 causes the windows to move to a second open configuration (e.g., open about 3 cm) which is more or less open than the first open configuration until the speed of the vehicle 12 reaches a second predetermined speed (e.g., 40 mph); when the speed reaches the second predetermined speed, the controller 16 causes the windows to move to a third open configuration (e.g., open about 1 cm) which is more or less open than the second open configuration until the speed of the vehicle 12 reaches a third predetermined speed (e.g., 50 mph). In an embodiment, the controller 16 operates in the same way as the speed decreases (e.g., adjusting the windows 20 as the speed of the vehicle 12 decreases past certain thresholds). In another embodiment, the controller 16 causes one or more window 20 to close a predetermined amount that is proportional to the increasing speed. In another embodiment, the controller 16 causes one or more window 20 to open a predetermined amount that is proportional to the decreasing speed. In an embodiment, the controller 16 utilizes an optimal zone determined during a calibration to determine how to adjust one or more window 20 as speed thresholds are met.

In an embodiment, the controller 16 initially sets the windows 20 in an initial configuration based on an optimal zone determined during calibration and/or a desired temperature level set by the occupant. Then, the controller 16 adjusts the windows based on the speed of the vehicle 12 as discussed herein.

In an embodiment, the controller 16 determines different amounts to adjust different windows 20 of the vehicle cabin 15. More specifically, the controller 16 independently controls different windows 20 of the vehicle cabin 15 by opening or closing different windows 20 by different amounts. In an embodiment, this can be because one or more window 20 is locked into a predetermined configuration at step 102. In another embodiment, this can be because the controller 16 determines that opening or closing different windows 20 by different amounts is the best method to achieve a desired noise level and/or temperature level. For example, opening or closing one window 20 may have more effect on the noise level than the temperature level, or vice versa. The controller 20 is configured to determine how different windows 20 affect the noise level and/or temperature level, for example, by performing a plurality of calibrations at step 102, with each calibration being for a different window 20 or a different combination of windows 20. In an embodiment, the controller 20 is configured to determine how different windows 20 affect the noise level and/or temperature level using trial and error based on feedback from one or more sensor 30.

In an embodiment, the controller is programmed to enable an occupant of the vehicle cabin 15 to set a configuration of a first window 20 of the plurality of windows 20 and cause adjustment of at least one second window 20 of the plurality of windows 20 based on the configuration of the first window 20 and feedback from the at least one noise sensor 30C. That is, the controller 16 is configured to only adjust windows 20 besides the first window 20 when performing the method 100 to achieve the desired noise level. For example, the controller 16 can use stored data relating to the optimal zone in which changes of other windows 20 besides the first window 20 lower the overall noise level. In another example, the controller 16 can cause incremental adjustment of the other windows 20 until achieving the desired noise level (e.g., using trial and error).

In an embodiment, the controller 16 processes an optimizer algorithm to determine the amount to adjust one or more window 20. In an embodiment, the optimizer algorithm is based on the optimal zone in which both a desired temperature of the vehicle cabin 15 is within a first range of temperature values and a desired noise level of the vehicle cabin 15 is within a second range of noise level values. The optimizer algorithm can be calibrated during the calibration process of step 102. Then, as the noise level and/or temperature level shifts away from the desired level during use of the vehicle 12, the controller 16 determines which window 20 to adjust and/or the amount of adjustment to bring the noise level and/or temperature level back within the optimal zone.

In an embodiment, the controller 16 uses multiple of the above methods in combination to determine an amount to adjust one or more window 20. For example, in an embodiment, the controller 16 is configured to first determine an amount to adjust one or more window 20 to adjust for one of temperature and noise level, and then determine an amount to adjust one or more window 20 to adjust for the other of temperature and noise level. Then, once the controller 16 has achieved the desired temperature and/or noise level so as to have achieved an optimized setting, the controller 16 monitors the speed of the vehicle 12 and further adjusts one or more window 20 as discussed herein based on speed.

In an embodiment, the controller 16 is continuously performing the method 100 and incrementally adjusting one or more window 20 based on feedback from one or more sensor 30. The amount can therefore be the increment that the controller 16 uses to continuously adjust the one or more window 20. The controller 16 is configured to adjust one or more window 20 by the increment and then receive feedback from one or more sensor 30 to determine how the movement of the one or more window 20 by the increment affected the temperature and/or noise level inside the vehicle cabin 15. The controller 15 then again adjusts one or more window 20 by the increment until the desired noise level and/or temperature level is achieved. In this way, the controller 20 is configured to adjust the overall noise level and/or temperature level using trial and error based on feedback from one or more sensor 30.

In an embodiment, the controller 16 uses the calibration process discussed herein to determine an initial configuration of one or more window 20, and then incrementally moves one or more window 20 as the noise level and/or temperature level shifts away from the desired noise level and/or the desired temperature level during use of the vehicle 12.

At step 110, the controller 16 causes at least one window 20 to be adjusted by the amount. Specifically, the controller 16 automatically causes at least one window 20 to be adjusted by the amount without additional instructions from the vehicle occupant. In this way, the controller 16 maintains the desired noise level and/or temperature level during use of the vehicle 12. As discussed above, the amount can be the increment or can be a variable amount calculated by the controller 16. In an embodiment, the controller 16 automatically causes different windows 20 of the vehicle cabin 15 to be adjusted by the different amounts.

In an embodiment, the controller 16 is programmed to continuously perform one or more steps of the method 100. For example, the controller 16 continuously detects vehicle data relating to at least one of the temperature of the vehicle cabin, the noise level of the vehicle cabin, or the speed of the vehicle cabin at step 106, continuously determines the amount to adjust the at least window 20 of the vehicle cabin 16 based on the vehicle data at step 108, and continuously automatically causes the at least one window 20 to be adjusted by the amount at step 110. By continuously performing these steps, the controller 16 is able to achieve and maintain optimal settings. In another embodiment, the occupant can adjust how sensitive the system 10 is, thus influencing the frequency of window movement during the method 100.

As discussed above, in an embodiment, the controller 16 is incrementally adjusting each window 20 based on feedback from one or more sensor 30. This way, the controller 16 is configured to determine optimal window placement which achieves the desired noise level and/or temperature level. Since the desired noise level and/or temperature level varies for different occupants, and the effects of temperature and wind noise based on window configuration vary with the type of vehicle cabin 15 and specific conditions, this allows the controller 16 to optimize the window settings for the specific vehicle cabin 15 and occupant on the fly. In an embodiment, once the controller 16 determines optimal window settings which achieve a desired noise level and/or temperature level, the controller 16 is configured to save those settings as a predetermined overall configuration that the controller 16 can set as an initial setting the next time the desired noise level and/or temperature level is requested. This way, the controller 16 can avoid or reduce the number of incremental adjustments as the controller 16 learns which settings are optimal based on the vehicle cabin 15 and/or occupant.

In an embodiment, an occupant of the vehicle 12 can adjust the settings determined by the controller 16 by speaking into the audio device 24. In an embodiment, the controller 16 is programmed to adjust the desired noise level based on feedback from an occupant (e.g., an occupant can say "Less noisy" to cause the controller 16 to lower the desired noise level). In an embodiment, the controller 16 is programmed to adjust the desired temperature level based on feedback from an occupant (e.g., an occupant can say "I need it cooler" to cause the controller 16 to adjust the desired temperature to a lower level). The method 100 then begins at step 102 again with the new desired level (e.g., desired temperature, desired noise level, etc.).

In an embodiment, once the controller 16 has achieved the desired noise level, the controller 16 is configured to continuously perform the method 100 to maintain the desired noise level. More specifically, the controller 16 is programmed to maintain the desired noise level within the vehicle cabin 15 by continuously adjusting at least one window 20 based on feedback from the at least one noise sensor 30C. In an embodiment, the controller 16 is programmed to maintain the desired noise level within a range of a predetermined values (e.g., between no wind noise and a maximum level of wind noise). In an embodiment, the controller 16 is programmed to maintain the desired noise level by independently adjusting multiple of the plurality of windows 20 based on feedback from the at least one noise sensor 30C.

In an embodiment, once the controller 16 has achieved the desired temperature level, the controller 16 is configured to continuously perform the method 100 to maintain the desired temperature level. More specifically, the controller 16 is programmed to maintain the desired temperature level within the vehicle cabin 15 by continuously adjusting at least one window 20 based on feedback from the at least one temperature sensor 30A, 30B. In an embodiment, the controller 16 is programmed to maintain the desired temperature level within a range of a predetermined values. In an embodiment, the controller 16 is programmed to maintain the desired temperature level by independently adjusting multiple of the plurality of windows 20 based on feedback from the at least one temperature sensor 30A, 30B.

In an embodiment, once the controller 16 has achieved the desired noise level and/or temperature level, the controller 16 is configured to continuously perform the method 100 based on feedback from the speed sensor 30D. For example, the controller 16 is configured to set the determined optimized window settings as the base settings, and then open and/or close the windows 20 as the speed of the vehicle 12 changes.

The systems and methods described herein are advantageous for maintaining a desired noise level and/or a desired temperature within a vehicle cabin 15 without a driver or passenger having to continuously adjust windows 20. It should be understood that various changes and modifications to the methods described herein will h apparent to those skilled in the art and can be made without diminishing the intended advantages.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle 12 equipped as disclosed herein. Accordingly, these terms, as utilized to describe the present invention should be interpreted relative to a vehicle 12 equipped as shown herein.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A system for adjusting one or more windows of a vehicle cabin of a vehicle, the system comprising:
    at least one noise sensor configured to detect wind noise at one or more locations of the vehicle cabin;
    a plurality of windows each adjustable between a plurality of configurations to permit differing levels of air flow between the vehicle cabin and an atmosphere outside of the vehicle cabin; and
    a controller programmed to (i) perform a calibration by moving at least one window of the plurality of windows between a plurality of open configurations while detecting a maximum level where wind noise initially peaks and a minimum level where the wind noise bottoms out before rising again, using feedback from the at least one noise sensor to determine a correspondence between the wind noise and each of the plurality open configurations, (ii) use the calibration to determine an optimal zone at which to maintain the at least one window in one or more of the plurality of open configurations, and (iii) cause an adjustment of the at least one window of the plurality of windows based on the optimal zone in combination with feedback from the at least one noise sensor regarding a detected level of wind noise.

2. The system of claim 1, wherein
the controller is further programmed to maintain a desired noise level within the vehicle cabin by continuously adjusting the at least one window based on the optimal zone in combination with the feedback from the at least one noise sensor.

3. The system of claim 2, wherein
the controller is further programmed to adjust the desired noise level based on feedback from an occupant of the vehicle cabin.

4. The system of claim 2, wherein
the controller is further programmed to maintain the desired noise level by independently adjusting multiple of the plurality of windows based on the optimal zone in combination with the feedback from the at least one noise sensor.

5. The system of claim 1, wherein
the controller is further programmed to (i) enable an occupant of the vehicle cabin to set a configuration of a first window of the plurality of windows, and (ii) cause adjustment of at least one second window of the plurality of windows based on the optimal zone in combination with the feedback from the at least one noise sensor.

6. The system of claim 1, wherein
the at least one noise sensor includes a microphone located within the vehicle cabin.

7. The system of claim 1, wherein
the controller is further programmed to maintain a desired temperature within the vehicle cabin when causing the adjustment of the at least one window based on the optimal zone in combination with the feedback from the at least one noise sensor.

8. The system of claim 1, further comprising:
at least one temperature sensor configured to measure temperature inside or outside of the vehicle cabin,
wherein the controller is programmed to adjust the at least one window further based on feedback from the at least one temperature sensor.

9. The system of claim 1, further comprising:
at least one speed sensor configured to detect a speed of the vehicle,
wherein the controller is programmed to adjust the at least one window further based on feedback from the at least one speed sensor.

10. The system of claim 1, wherein
during the calibration, the controller is programmed to determine a range of temperature levels at which wind noise is minimized, and
when using the calibration to determine the optimal zone, the controller is programmed to further set the optimal zone so that both a desired temperature of the vehicle cabin is within a range of temperature values and a desired noise level of the vehicle cabin is within a range of noise level values.

11. The system of claim 1, wherein
the calibration includes at least a first calibration and a second calibration,
the controller is programmed to perform the first calibration by moving a first window or first combination of windows between the plurality of open configurations, and
the controller is programmed to perform the second calibration by moving a second window or second combination of windows between the plurality of open configurations.

12. The system of claim 1, wherein
the controller is further programmed to (i) determine a first range of temperatures which fall within the optimal zone, (ii) enable a vehicle occupant to choose a desired temperature level or second range of temperatures within the first range of temperatures, and (iii) maintain the desired temperature level or the second range of temperatures when causing the adjustment of the at least one window of the plurality of windows.

13. A system for adjusting one or more windows of a vehicle cabin of a vehicle, the system comprising:
a plurality of windows each adjustable between a plurality of configurations to permit differing levels of air flow between the vehicle cabin and an atmosphere outside of the vehicle cabin; and
a controller programmed to (i) perform a calibration by causing at least one window of the plurality of windows to move between a plurality of configurations to determine a maximum wind noise level corresponding to a first open configuration where wind noise initially peaks and a minimum wind noise level corresponding to a second open configuration where the wind noise bottoms out before rising again, (ii) use the calibration to determine an optimal zone in which the at least one window is positioned such that a desired noise level of the vehicle cabin is within a range of noise level values and a desired temperature of the vehicle cabin is within a range of temperature values, and (iii) maintain the at least one window within the optimal zone.

14. The system of claim 13, further comprising:
at least one temperature sensor configured to measure temperature inside or outside of the vehicle cabin; and
at least one noise sensor configured to detect wind noise at one or more locations of the vehicle cabin,
wherein the controller is further programmed to cause continuous adjustment of the plurality of windows based on feedback from the at least one temperature sensor and the at least one noise sensor.

15. The system of claim 13, further comprising:
at least one speed sensor configured to measure a speed of the vehicle,
wherein the controller is further programmed to cause continuous adjustment of the plurality of windows based on feedback from the at least one speed sensor.

16. The system of claim 13, further comprising:
at least one inside temperature sensor configured to measure temperature inside the vehicle cabin; and
at least one outside temperature sensor configured to measure temperature outside the vehicle cabin,
wherein the controller is further programmed to use a temperature differential determined based on feedback from the at least one inside temperature sensor and the at least one outside temperature sensor to determine an amount to adjust at least one of the plurality of windows.

17. A method of adjusting one or more windows of a vehicle cabin of a vehicle, the method comprising:
performing, by a controller, a calibration in which the one or more windows are moved between a plurality of open configurations while detecting a maximum level where wind noise initially peaks and a minimum level where the wind noise bottoms out before rising again to determine an optimal zone for noise level in which the one or more windows are located between a first open configuration and a second open configuration;
detecting vehicle data relating to a speed of the vehicle;
adjusting, by the controller, the optimal zone based on the detected vehicle data relating to the speed of the vehicle;
determining, by the controller, an amount to adjust at least one window of the one or more windows of the vehicle cabin based on the adjusted optimal zone; and
automatically causing, by the controller, the at least one window to be adjusted by the amount.

18. The method of claim 17, further comprising:
detecting vehicle data relating to a temperature of the vehicle cabin, and
maintaining a desired temperature in the vehicle cabin using the detected vehicle data relating to the temperature of the vehicle cabin when adjusting the at least one window by the amount.

19. The method of claim 17, wherein
determining the amount to adjust the at least one window includes determining different amounts to adjust different windows of the vehicle cabin, and
automatically causing the at least one window to be adjusted includes automatically causing the different windows of the vehicle cabin to be adjusted by the different amounts.

20. The method of claim 17, comprising
continuously detecting the vehicle data relating to the speed of the vehicle cabin,
continuously adjusting, by the controller, the optimal zone based on the detected vehicle data;
continuously determining the amount to adjust the at least one window of the vehicle cabin based on the adjusted optimal zone, and
continuously automatically causing the at least one window to be adjusted by the amount.

* * * * *